US007360220B2

(12) United States Patent
Ramanujam et al.

(10) Patent No.: US 7,360,220 B2
(45) Date of Patent: Apr. 15, 2008

(54) METHODS AND APPARATUS FOR MULTI-THREADING USING DIFFERENTLY CODED SOFTWARE SEGMENTS TO PERFORM AN ALGORITHM

(75) Inventors: Gopalan Ramanujam, Portland, OR (US); Narendra S. Nayak, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 868 days.

(21) Appl. No.: 10/284,602

(22) Filed: Oct. 31, 2002

(65) Prior Publication Data

US 2004/0088708 A1 May 6, 2004

(51) Int. Cl.
G06F 9/46 (2006.01)
(52) U.S. Cl. ...................... 718/107; 718/104
(58) Field of Classification Search ........ 718/104–108; 712/225, 228, 244
See application file for complete search history.

(56) References Cited

U.S. PATENT DOCUMENTS

| | | | | |
|---|---|---|---|---|
| 5,339,426 A | * | 8/1994 | Aoshima | 713/1 |
| 5,404,469 A | * | 4/1995 | Chung et al. | 712/215 |
| 5,659,751 A | * | 8/1997 | Heninger | 719/332 |
| 5,740,463 A | * | 4/1998 | Oshima et al. | 712/11 |
| 6,052,708 A | * | 4/2000 | Flynn et al. | 718/108 |
| 6,321,373 B1 | * | 11/2001 | Ekanadham et al. | 717/119 |
| 6,324,588 B1 | * | 11/2001 | Desruisseaux et al. | 719/313 |
| 6,542,988 B1 | * | 4/2003 | Tremblay et al. | 712/225 |
| 6,883,107 B2 | * | 4/2005 | Rodgers et al. | 713/601 |
| 6,889,319 B1 | * | 5/2005 | Rodgers et al. | 712/228 |
| 6,968,445 B2 | * | 11/2005 | Hokenek et al. | 712/222 |
| 6,978,460 B2 | * | 12/2005 | Arakawa | 718/103 |
| 7,039,794 B2 | * | 5/2006 | Rodgers et al. | 712/244 |
| 7,089,405 B2 | * | 8/2006 | Yeluri | 712/217 |
| 7,124,160 B2 | * | 10/2006 | Saulsbury et al. | 708/490 |

\* cited by examiner

*Primary Examiner*—Van H. Nguyen
(74) *Attorney, Agent, or Firm*—Hanley, Flight, & Zimmerman

(57) ABSTRACT

Methods and apparatus for multi-threading on a simultaneous multi-threading processor are provided. The methods and apparatus described herein increase computational throughput by launching two or more computational threads to perform the same algorithm using two different software segments. One of the software segments is coded to perform the algorithm using primarily a first processor resource (e.g., a floating point unit). Another software segment is coded to perform the same algorithm using a primarily a second processor resource (e.g., an integer execution unit). A workload requiring execution of the algorithm is allocated to the threads in a balanced manner (e.g., faster code segments are given more of the workload). The threads use different processor resources, therefore the threads are able to execute in parallel in an efficient manner. When each of the threads completes execution, the results may be synchronized.

30 Claims, 4 Drawing Sheets

METHODS AND APPARATUS FOR MULTI-THREADING USING DIFFERENTLY CODED SOFTWARE SEGMENTS TO PERFORM AN ALGORITHM

TECHNICAL FIELD

The present disclosure relates in general to computer systems and, in particular, to methods and apparatus for multi-threading on a simultaneous multi-threading computer system.

BACKGROUND

Often, designers of computing systems and software attempt to increase computational throughput by performing operations in parallel. For example, offloading certain graphics operations to a separate graphics processor frees up a main processor to perform other operations. Some processor architectures support simultaneous multi-threading (SMT) within the processor itself. For example, the Intel® Hyper-Threading architecture allows multiple threads to issue instructions on the same clock cycle.

Often, when two parallel threads are executing different algorithms (i.e., functional decomposition), multi-threading results in increased computational throughput. For example, if a first thread is adding a plurality of integers and a second thread is computing a floating-point number, the operations are likely using different processor resources (e.g., an integer execution unit and a floating-point unit), therefore there is a benefit to operating in parallel.

However, if the two parallel threads vie for the same processor resources (e.g., the same integer execution unit) contention arises, and the benefits of parallelism are significantly reduced. In fact, in some instances, performance may actually be degraded. This is often the case when a single large task is broken into two or more smaller tasks that use the same algorithm (i.e., domain decomposition). For example, a user may issue a command to "dim" a digital image. This request may require the processor to subtract an integer from every value in a large bit map. This single large task (dim the picture) is easily broken into two smaller tasks that use the same algorithm (dim the first half of the picture and dim the second half of the picture). However, on a simultaneous multi-threading device, performing these two tasks in parallel may offer little benefit, because both tasks may vie for the same processor resource (e.g., the integer execution unit).

DETAILED DESCRIPTION OF EXAMPLES

In general, the example methods and apparatus described herein increase computational throughput by launching two or more computational threads to perform the same algorithm using two different software segments. One of the software segments is coded to perform the algorithm using primarily a first processor resource (e.g., a floating point unit). Another software segment is coded to perform the same algorithm using a primarily a second processor resource (e.g., an integer execution unit). A workload requiring execution of the algorithm is allocated to the threads in a balanced manner (e.g., faster code segments are given more of the workload). The threads use different processor resources, therefore the threads are able to execute in parallel in an efficient manner. When each of the threads completes execution, the results may be synchronized.

Figure 1:
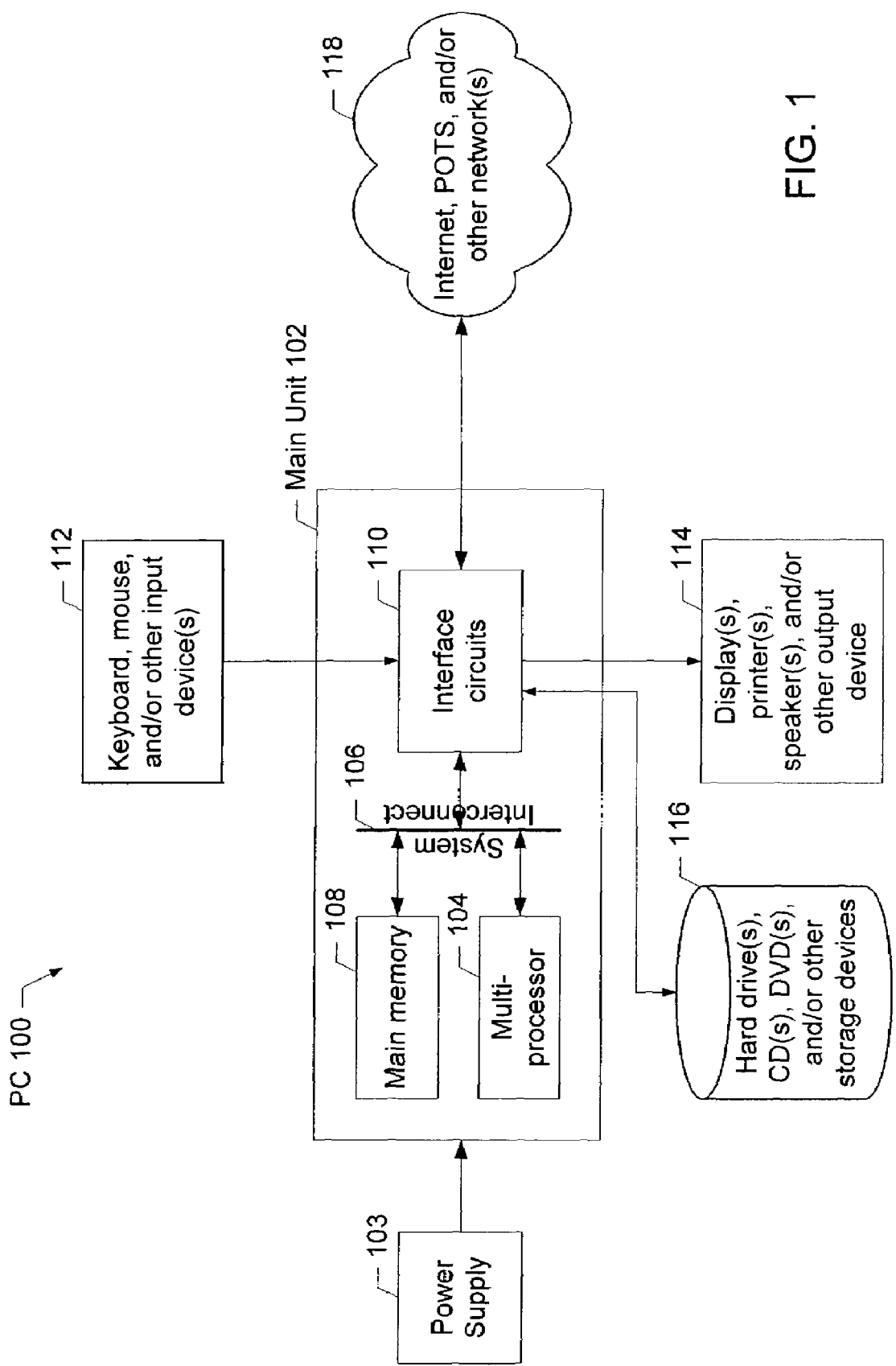
FIG. 1 is a block diagram of an example computer system.

A block diagram of a computer system 100 is illustrated in FIG. 1. The computer system 100 may be a personal computer (PC), a personal digital assistant (PDA), an Internet appliance, a cellular telephone, or any other computing device. In an example, the computer system 100 includes a main unit 102 powered by a power supply 103. The main unit 102 may include one or more processors 104 electrically coupled by a system interconnect 106 to a main memory device 108 and one or more interface circuits 110. The processor(s) 104 may be simultaneous multi-threading devices and/or symmetric multiprocessing devices. In an example, the system interconnect 106 is an address/data bus. Of course, a person of ordinary skill in the art will readily appreciate that interconnects other than busses may be used to connect the processor 104 to the main memory device 108. For example, one or more dedicated lines and/or a crossbar may be used to connect the processor 104 to the main memory device 108.

The processor 104 may be a simultaneous multi-threading (SMT) processor and may include any number of processor resources. For example, the processor 104 may include an integer execution unit, a floating-point unit, a single instruction multiple data (SIMD) unit, etc. The processor 104 may include any type of well known processing unit, such as a microprocessor from the Intel Pentium™ family of microprocessors, the Intel Itanium™ family of microprocessors, and/or the Intel XScale™ family of processors. The processor 104 may also include any type of well known cache memory, such as static random access memory (SRAM). The main memory device 108 may include dynamic random access memory (DRAM) and/or any other form of random access memory. For example, the main memory device 108 may include double data rate random access memory (DDRAM). The main memory device 108 may also include non-volatile memory. In an example, the main memory device 108 stores a software program which is executed by the processor 104 in a well known manner.

The interface circuit(s) 110 may be implemented using any type of well known interface standard, such as an Ethernet interface and/or a Universal Serial Bus (USB) interface. One or more input devices 112 may be connected to the interface circuits 110 for entering data and commands into the main unit 102. For example, an input device 112 may be a keyboard, mouse, touch screen, track pad, track ball, isopoint, and/or a voice recognition system.

One or more displays, printers, speakers, and/or other output devices 114 may also be connected to the main unit 102 via one or more of the interface circuits 110. The display 114 may be cathode ray tube (CRTs), liquid crystal displays (LCDs), or any other type of display. The display 114 may generate visual indications of data generated during operation of the main unit 102. The visual displays may include prompts for human operator input, calculated values, detected data, etc.

The computer system 100 may also include one or more storage devices 116. For example, the computer system 100 may include one or more hard drives, a compact disk (CD) drive, a digital versatile disk drive (DVD), and/or other computer media input/output (I/O) devices.

The computer system 100 may also exchange data with other devices via a connection to a network 118. The network connection may be any type of network connection, such as an Ethernet connection, digital subscriber line (DSL), telephone line, coaxial cable, etc. The network 118 may be any type of network, such as the Internet, a telephone network, a cable network, and/or a wireless network.

Figure 2:
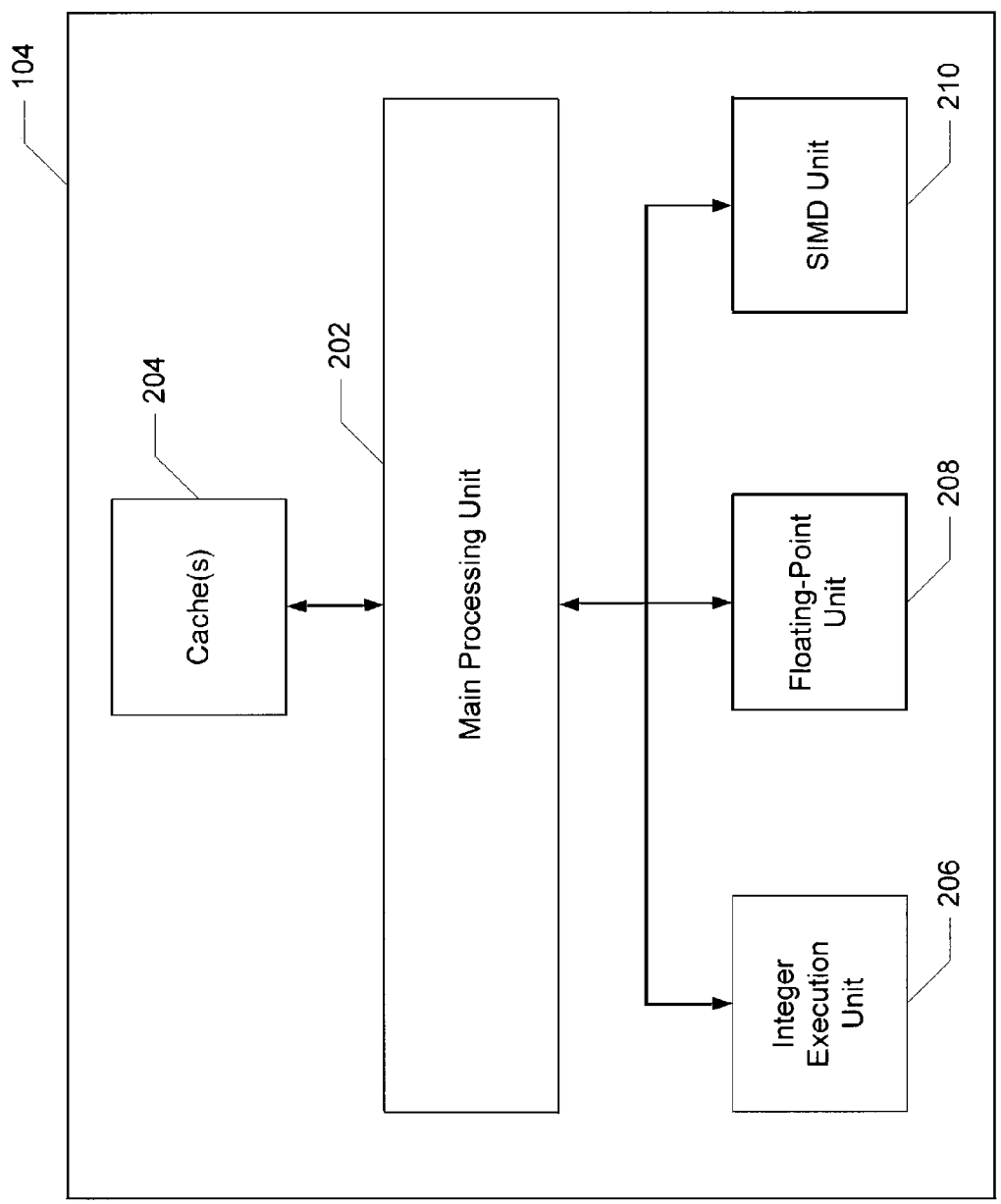
FIG. 2 is a block diagram of an example processor.

A block diagram of an example processor 104 is illustrated in FIG. 2. The processor 104 includes a main processing unit 202, which executes software instructions. Some of these software instructions use additional processor resources, such as cache(s) 204, an integer execution unit 206, a floating-point unit 208, a single instruction multiple data (SIMD) unit 210, and/or any other processor resources. Although each of these processor resources is illustrated inside the processor 104, any of these and/or other processor resources may be located outside the processor 104. The cache(s) store data and/or instructions, which are used by the main processing unit 202. The integer execution unit 206 performs mathematical algorithms using integer operands. The floating-point unit 208 performs mathematical algorithms using floating-point operands. The single instruction multiple data (SIMD) unit 210 performs single instruction operations using multiple data operands. Any processor resource may consume less power than any other processor resource. Accordingly, certain software segments may be structured to consume less power.

Figure 3:
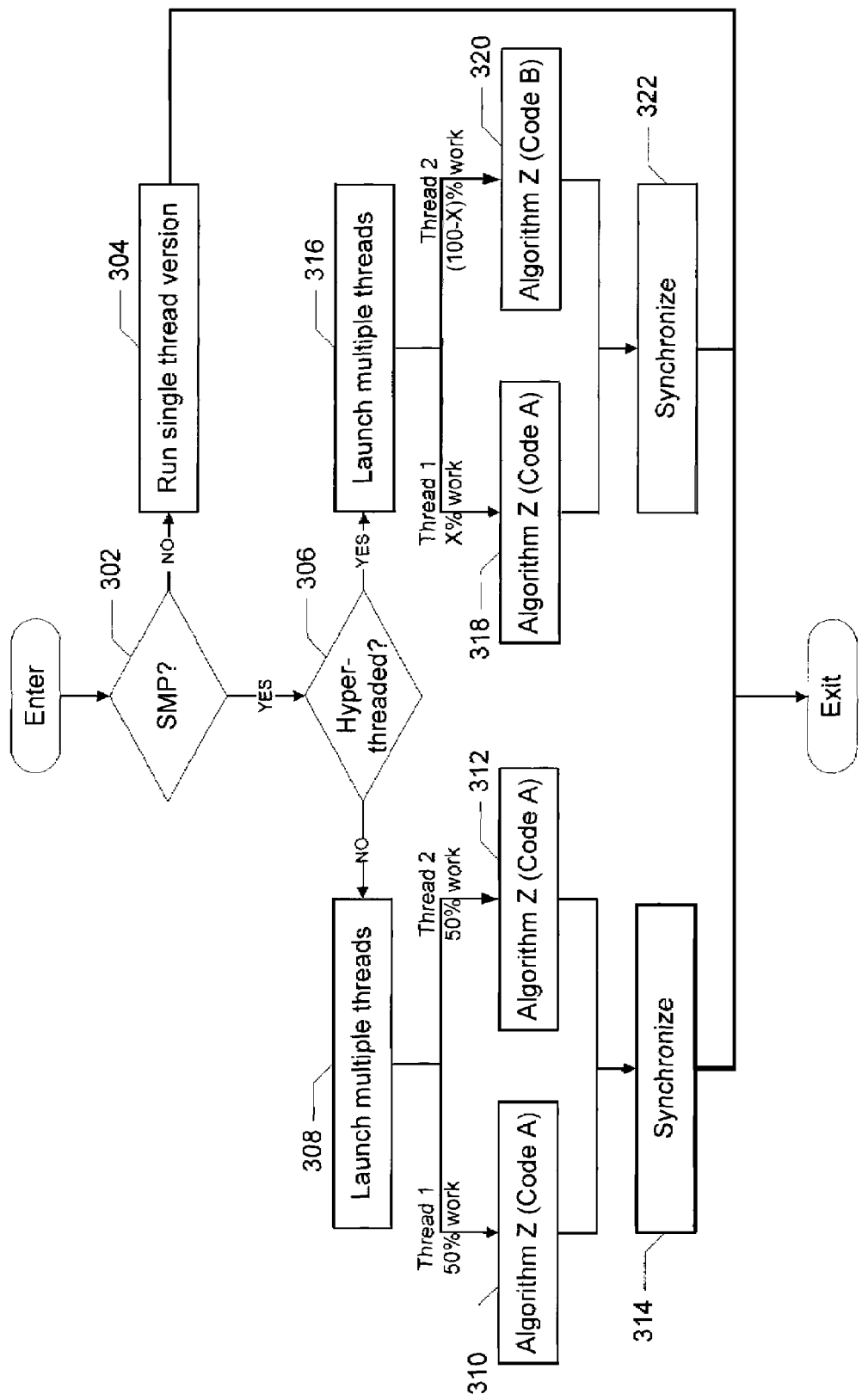
FIG. 3 is a flowchart of an example process for multi-threading.

A flowchart of a process 300 for multi-threading is illustrated in FIG. 3. Preferably, the process 300 is embodied in a software program or a set of computer instructions which are stored in memory 108 and executed by the processor 104 in a well known manner. However, some or all of the blocks of the process 300 may be performed manually and/or by another device. Although the process 300 is described with reference to the flowchart illustrated in FIG. 3, a person of ordinary skill in the art will readily appreciate that many other methods of performing the process 300 may be used. For example, the order of many of the blocks may be changed, and/or the blocks themselves may be changed, combined and/or eliminated.

Generally, the process 300 causes the processor 104 to determine if the processor 104 is a symmetric multi-processing processor and/or a hyper-threaded processor. If the processor 104 is a symmetric multi-processing processor and a hyper-threaded processor, multiple processing threads executing different codes are used. Otherwise, multiple processing threads executing different codes are not used.

The process 300 begins by causing the processor 104 to determine if the processor 104 is a symmetric multi-processing processor (block 302). In one example, the processor 104 determines if the processor 104 is a symmetric multi-processing processor by retrieving a data value indicative of a processor type from a predetermined non-volatile memory location. If the processor 104 is not a symmetric multi-processing processor (block 302), a single threaded version of the software program is executed as a single thread (block 304).

If the processor 104 is a symmetric multi-processing processor, the process 300 causes the processor 104 to determine if the processor 104 is also a hyper-threaded processor (block 306). In one example, the processor 104 determines if the processor 104 is a hyper-threaded processor by retrieving a data value indicative of a processor type from a predetermined non-volatile memory location. If the processor 104 is not also a hyper-threaded processor (block 306), the process 300 causes two (or more) threads to be launched (block 308). Each of these threads performs the required algorithm (e.g., algorithm Z) using the same code (e.g., code A) (blocks 310 and 312). The workload associated with the algorithm is evenly distributed between the threads (e.g., 50% each for two threads). When both threads complete execution, the results are synchronized (block 314).

If the processor 104 is both a symmetric multi-processing processor and a hyper-threaded processor, the process 300 causes two (or more) threads to be launched (block 316). Each of these threads performs the required algorithm (e.g., algorithm Z) using different codes (e.g., code A and code B ) (blocks 318 and 320). The workload associated with the algorithm is not necessarily distributed evenly between the threads. Instead, the workload is distributed based on the average run-time of the two (or more) codes and/or some other statistic associated with the codes as described in detail below. Again, when both threads complete execution, the results are synchronized (block 322).

Figure 4:
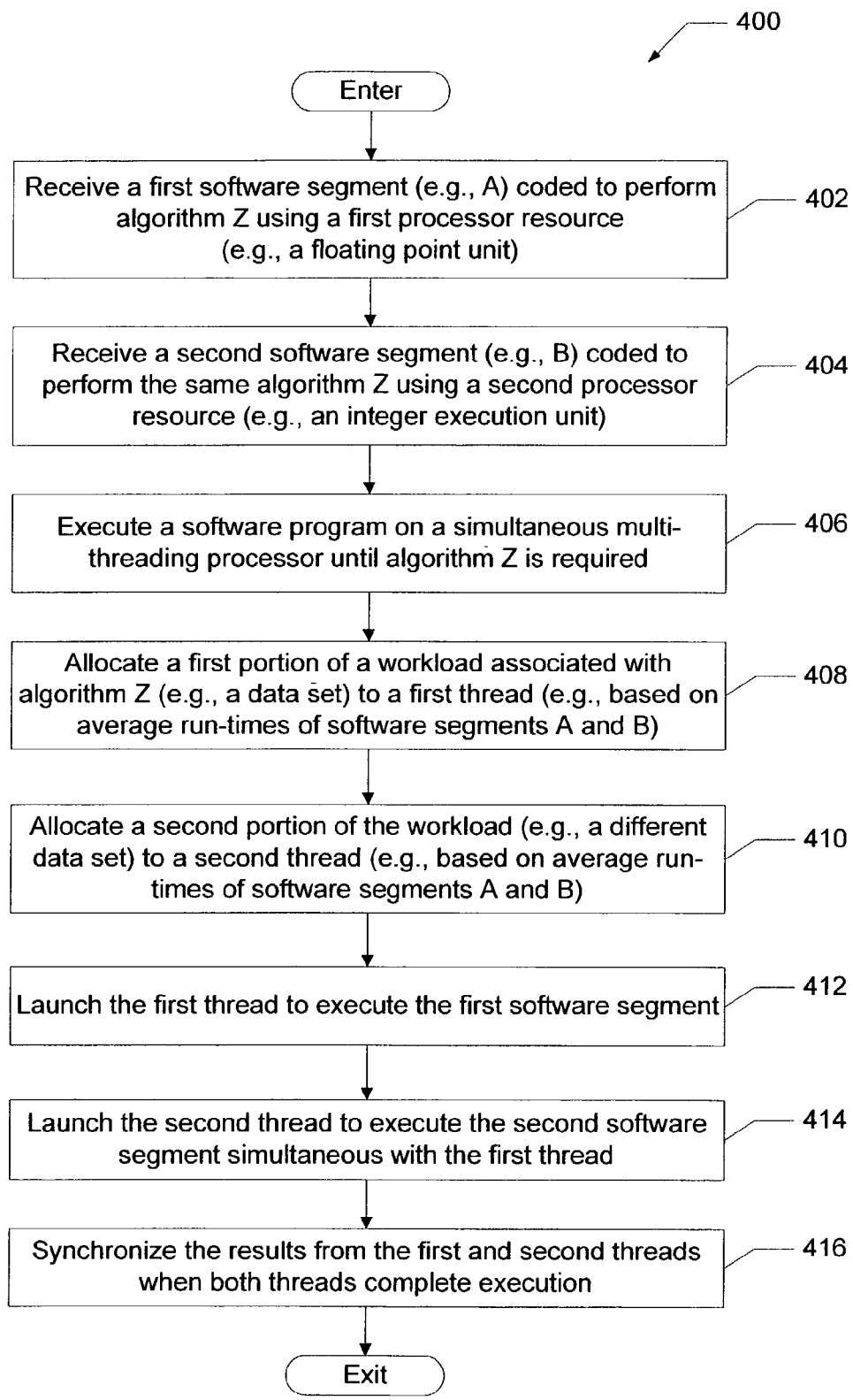
FIG. 4 is a flowchart of another example process for multi-threading.

A flowchart of another process 400 for multi-threading is illustrated in FIG. 4. Preferably, the process 400 is embodied in a software program or a set of computer instructions which are stored in memory 108 and executed by the processor 104 in a well known manner. However, some or all of the blocks of the process 400 may be performed manually and/or by another device. Although the process 400 is described with reference to the flowchart illustrated in FIG. 4, a person of ordinary skill in the art will readily appreciate that many other methods of performing the process 400 may be used. For example, the order of many of the blocks may be changed, and/or the blocks themselves may be changed, combined and/or eliminated.

Generally, the process 400 causes the processor 104 to launch two computational threads to perform the same algorithm using two different software segments. A software segment is one or more software instructions. The first software segment is coded to perform the algorithm using primarily a first processor resource (e.g., a floating point unit). The second software segment is coded to perform the same algorithm using primarily a second processor resource (e.g., an integer execution unit). A workload requiring execution of the algorithm is allocated to the threads in a balanced manner (e.g., faster code segments are given more of the workload). The threads use different processor resources. Therefore, the threads are able to execute in parallel in an efficient manner. When each of the threads completes execution, the results are synchronized.

The process 400 begins when the processor 104 receives two or more software segments structured to perform the same algorithm or function in two or more different ways (blocks 402 and 404). More specifically, a first software segment is coded to consume primarily one processor resource, while a second software segment is structured to consume primarily another processor resource. For example, an algorithm to compute X raised to the Yth power may be coded in a first software segment to use a floating-point unit 208 and coded in a second software segment to use an integer execution unit 206. Of course, a person of ordinary skill in the art will readily appreciate that any number of software segments performing the same algorithm, but using different hardware resources may be used. For example, a third software segment coded to consume primarily a single-instruction-multiple-data (SIMD) unit may be used. In addition, software segments coded to consume a particular resource may also utilize other resources.

Subsequently, during execution of a software program on the processor 104, the algorithm which was coded in different ways to consume different processor resources is required by the software program (block 406). Of course, a plurality of different algorithms may each be coded in different ways to consume different processor resources. When one of these algorithms is required by the software program, a first portion of a workload (e.g., a portion of the data) associated with the algorithm is allocated to a first processing thread (block 408). Similarly, a second portion of the workload associated with the algorithm is allocated to a second processing thread (block 410). In one example, the entire workload associated with the algorithm is allocated between the first processing thread (e.g., X %) and the second processing thread (e.g., 100%-X %). Of course, any number of threads may be used.

The workload may be evenly distributed between the threads, or the workload may be unevenly distributed based on some statistic associated with the software segments such as an average run-time of each software segment. For example, assume a first software segment has an average run-time of 1 ms, and a second software segment has an average run-time of 3 ms. If these two software segments are to take the entire workload, then a first processing thread executing the first software segment may be allocated approximately 75% of the workload, while a second processing thread executing the second software segment may be allocated approximately 25% of the workload. Again, any number of software segments and threads may be used. However, when two software segments are used, where the average run-time of the first software segment is x, and the average run-time of the second software segment is y, one balancing scheme may be expressed as $$\left(\frac{y/x}{(y/x)+1}\right)*100\%$$

of the workload for a first thread and 100−

$$\left(\frac{y/x}{(y/x)+1}\right)*100\%$$

of the workload for a second thread. In this time balancing scheme, each thread will complete execution at approximately the same time, thereby maximizing processor resource utilization. In addition, the workload may be distributed between the threads based on experimentation.

Regardless of what time balancing scheme is used, a first processing thread is launched by the processor 104 to execute the first software segment (block 412). Similarly, a second processing thread is launched by the processor 104 to execute the second software segment (block 414). At least a portion of the processing threads execute on the processor 104 simultaneously, because the software segments are coded to consume different processor resources, and the processor 104 is an SMT processor. After two or more of the threads complete execution, the results are synchronized (block 416). Subsequently, the processor 104 may continue executing the software program (block 406).

In summary, persons of ordinary skill in the art will readily appreciate that methods and apparatus for multi-threading on a simultaneous multi-threading computer system have been provided. The foregoing description has been presented for the purposes of illustration and description. It is not intended to be exhaustive or to limit the scope of this patent to the examples disclosed. Many modifications and variations are possible in light of the above teachings. It is intended that the scope of this patent be defined by the claims appended hereto as reasonably interpreted literally and under the doctrine of equivalents.

What is claimed is:

1. A method comprising:
    receiving a first software segment structured to perform an algorithm;
    receiving a second software segment structured to perform the algorithm, the second software segment being coded differently than the first software segment;
    allocating a first portion of a workload associated with using the algorithm to a first thread;
    allocating a second portion of the workload associated with using the algorithm to a second thread;
    launching the first thread on a simultaneous multi-threading processor to execute the first software segment; and
    launching the second thread on the simultaneous multi-threading processor to execute the second software segment, at least a portion of the second thread executing during execution of the first thread.

2. A method as defined in claim 1, wherein the first software segment and the second software segment are structured to consume different processor resources.

3. A method as defined in claim 1, wherein the first software segment is structured to consume less power than the second software segment.

4. A method as defined in claim 1, wherein the first software segment is structured to consume more of a first processor resource per execution time than the second software segment.

5. A method as defined in claim 4, wherein the first processor resource is an integer execution unit.

6. A method as defined in claim 4, wherein the first processor resource is a floating-point unit.

7. A method as defined in claim 4, wherein the first processor resource is a single instruction multiple data (SIMD) unit.

8. A method as defined in claim 4, wherein the second software segment is structured to consume more of a second processor resource per execution time than the first software segment.

9. A method as defined in claim 8, wherein the first processor resource is an integer execution unit and the second processor resource is a floating-point unit.

10. A method as defined in claim 8, wherein the first processor resource is an integer execution unit and the second processor resource is a single instruction multiple data (SIMD) unit.

11. A method as defined in claim 8, wherein the first processor resource is a floating-point unit and the second processor resource is a single instruction multiple data (SIMD) unit.

12. A method as defined in claim 1, further comprising synchronizing a first result from the first thread with a second result from the second thread.

13. A method as defined in claim 1, further comprising balancing a first computational run-time associated with the first thread and a second computational run-time associated with the second thread.

14. A method as defined in claim 13, wherein balancing the first computational run-time and the second computational run-time comprises allocating X % of a work load to the first thread and (100−X) % of the work load to the second thread.

15. A method as defined in claim 13, wherein the first software segment has a first average run-time of x, the second software segment has a second average run-time of y, and balancing the first computational run-time and the second computational run-time comprises allocating $$\left(\frac{y/x}{(y/x)+1}\right)*100\%$$

of a work load to the first thread.

16. A method as defined in claim 15, wherein balancing the first computational run-time and the second computational run-time comprises allocating $$100-\left(\frac{y/x}{(y/x)+1}\right)*100\%$$

of the work load to the second thread.

17. An apparatus comprising:
a memory device storing a first software segment structured to perform an algorithm and a second software segment structured to perform the algorithm, the first software segment being coded different than the second software segment; and
a simultaneous multi-threading processor coupled to the memory device, the simultaneous multi-threading processor to:
allocate a first portion of a workload associated with using the algorithm to a first thread;
allocate a second portion of the workload associated with using the algorithm to a second thread; and
launch the first thread to execute the first software segment and the second thread to execute the second software segment, at least a portion of the second thread executing during execution of the first thread.

18. An apparatus as defined in claim 17, further comprising:
a first processor resource coupled to the processor, and
a second processor resource coupled to the processor, the second software segment being structured to consume more of the second processor resource per execution time than the first processor resource, the first software segment being structured to consume more of the first processor resource per execution time than the second processor resource.

19. An apparatus as defined in claim 18, wherein the first processor resource comprises an integer execution unit and the second processor resource comprises a floating-point unit.

20. An apparatus as defined in claim 18, wherein the first processor resource comprises an integer execution unit and the second processor resource comprises a single-instruction-multiple-data unit.

21. An apparatus as defined in claim 18, wherein the first processor resource comprises a floating-point unit and the second processor resource comprises a single-instruction-multiple-data unit.

22. An apparatus as defined in claim 17, further comprising:
a first processor resource coupled to the processor, and
a second processor resource coupled to the processor, the second software segment being structured to consume more of the second processor resource per execution time than the first software segment.

23. An apparatus as defined in claim 17, wherein the processor balances a first computational run-time associated with the first thread and a second computational run-time associated with the second thread.

24. An apparatus as defined in claim 23, wherein balancing the first computational run-time and the second computational run-time comprises allocating X % of a work load to the first thread and (100−X) % of the work load to the second thread.

25. An apparatus as defined in claim 23, wherein the first software segment has a first average run-time of X, the second software segment has a second average run-time of Y, and balancing the first computational run-time and the second computational run-time comprises allocating $$\left(\frac{y/x}{(y/x)+1}\right)*100\%$$

of a work load to the first thread.

26. An apparatus as defined in claim 25, wherein balancing the first computational run-time and the second computational run-time comprises allocating $$100-\left(\frac{y/x}{(y/x)+1}\right)*100\%$$

of the work load to the second thread.

27. A machine readable medium storing instructions structured to cause a machine to:
receive a first software segment structured to perform an algorithm;
receive a second software segment structured to perform the algorithm, the second software segment being coded differently than the first software segment; allocate a first portion of a workload associated with using the algorithm to a first thread;
allocate a second portion of the workload associated with using the algorithm to a second thread;
launch the first thread on a simultaneous multi-threading processor to execute the first software segment; and
launch the second thread on the simultaneous multi-threading processor to execute the second software segment, at least a portion of the second thread executing during execution of the first thread.

28. A machine readable medium as defined in claim 27, wherein the first software segment and the second software segment are structured to consume different processor resources.

29. A machine readable medium as defined in claim 27, wherein the first software segment is structured to consume more of a first processor resource per execution time than the second software segment.

30. A machine readable medium as defined in claim 29, wherein the second software segment is structured to consume more of a second processor resource per execution time than the first software segment.

* * * * *